Oct. 24, 1967 J. LADONICZKI 3,349,310
MULTI-PURPOSE AND SELF-POLARIZED POWER PACK
Filed March 19, 1964 4 Sheets-Sheet 1

INVENTOR
Joseph Ladoniczki

BY *Birch and O'Brien*

ATTORNEYS

INVENTOR
Joseph Ladoniczki

BY Birch and O'Brien

ATTORNEYS

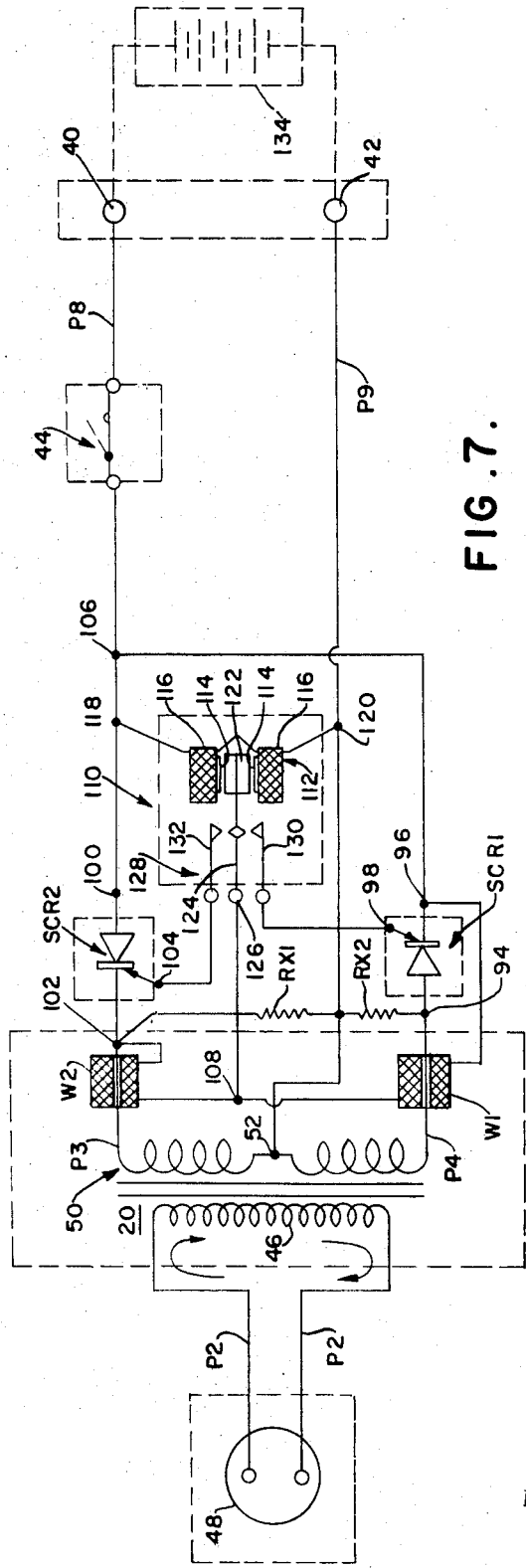
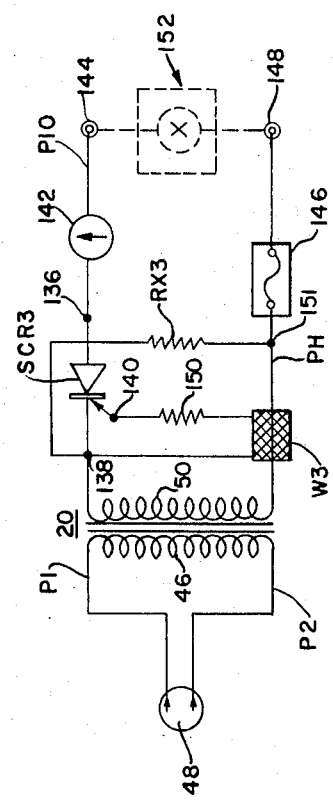
FIG. 7.
FIG. 8.
INVENTOR
Joseph Ladoniczki
BY *Birch and O'Brien*
ATTORNEYS Oct. 24, 1967  J. LADONICZKI  3,349,310
MULTI-PURPOSE AND SELF-POLARIZED POWER PACK
Filed March 19, 1964  4 Sheets-Sheet 4

INVENTOR
Joseph Ladoniczki

BY Birch and O'Brien
ATTORNEYS

United States Patent Office 3,349,310
Patented Oct. 24, 1967

3,349,310
MULTI-PURPOSE AND SELF-POLARIZED
POWER PACK
Joseph Ladoniczki, Orange City, Fla., assignor to Medaris, Cruger & Patterson, Inc., Winter Park, Fla., a corporation of Florida
Filed Mar. 19, 1964, Ser. No. 353,050
12 Claims. (Cl. 320—25)

This invention relates to power packs for supplying a direct current load from an alternating current source and more particularly to power packs which automatically sense the polarity of the load and automatically self-compensate for such polarity; and further relates to power packs having stable operating temperatures and self-contained automatic thermal protection means.

It has long been a basic problem in the power pack art, particularly wherein power packs are used for the charging of storage batteries, that an improper connection of the battery load, from the standpoint of polarity, with the power pack could result in irreparable damage to the battery.

Another problem involved, where batteries and other loads must be supplied by and connected with a power pack under ambient conditions which include inflammable vapors such as gasoline fumes and the like, is one of arcing during connection of the load resulting in the danger of explosions.

Still another problem which must be solved is one of heat dissipation from small portable power packs which become too hot to handle comfortably. This is a particular problem in power packs of the in-line type.

It is, therefore, an object of this invention to provide a power pack which automatically adjusts to the polarity of the load to which it is connected.

Another object of this invention is to provide a power pack which is explosion proof in that arcing is obviated during connection thereof to a load.

Another object of this invention is to provide a power pack of the in-line type which will assume a stable external operating temperature permitting said power pack to be readily and comfortably handled.

Still another object of this invention is to provide a new and novel battery charging circuit which is instantaneously self-polarizing with respect to a battery load when connected with said battery load.

Still another object of this invention is to provide a new and novel solid state battery charging circuit, utilizing silicon controlled rectifiers, which is instantaneously self-polarizing with respect to a battery load when connected with said battery load.

Yet another object of this invention is to provide new and novel heat sink structures for rectification means in a power pack.

Yet another object of this invention is to provide new and novel structural packaging for in-line power packs including new and novel cooperating integral heat sink means therein, whereby the external operating temperature thereof reaches an equilibrium value which is comfortable for human handling and which is maintainable for indefinitely extended operation of said power pack.

Yet another object of the invention is to provide self-regulating, battery charging power packs which will not overcharge the battery load.

These and other objects of this invention will become more fully apparent with reference to the following specification and drawings which relate to several preferred embodiments of the invention.

In the drawings:

FIGURE 7 is a circuit diagram of a second solid state embodiment of a self-polarizing battery charger of the present invention;

FIGURE 8 is a circuit diagram of a third embodiment of a solid state battery charger of the present invention;

Figure 1:
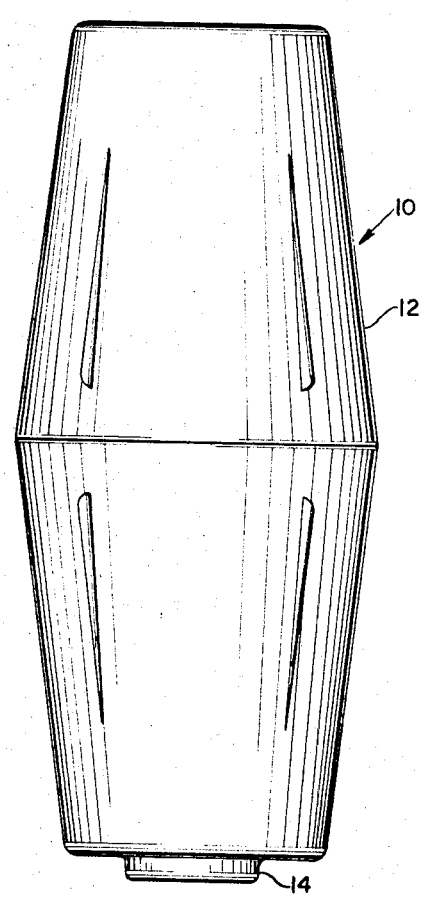
FIGURE 1 is a plan view of a power pack of the present invention.

Referring in detail to the drawings, and more particularly to FIGURE 1, the power pack 10 of the present invention is shown to comprise a generally oblong geometric body encased in a shell 12 of polycarbonate resin, rubber or other suitable material. A socket 14 for the output connections of the power pack 10 is shown at the upper end thereof. The lower end of the power pack 10 carries a countersunk socket connection such as the input pin-socket 16 shown at the lower end of the power pack 10 in FIGURE 2.

Figure 2:
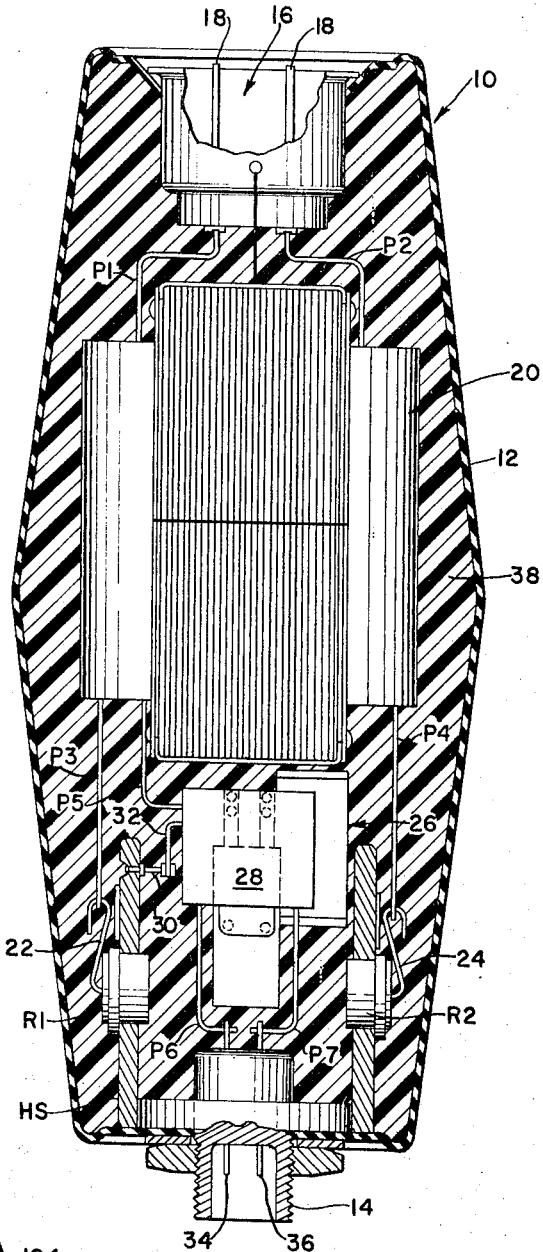
FIGURE 2 is a cross section taken along line 2—2 of FIGURE 1.

Referring further to FIGURE 2, the input socket 16 includes input pins 18 which are connected via a pair of power leads P1 and P2 which also comprise the primary leads of a transformer 20.

The output side of the transformer 20 comprises secondary power leads P3 and P4 and a secondary center tap lead P5.

The leads P3 and P4 are connected, respectively, to the anode leads 22 and 24 of first and second rectifiers or diodes R1 and R2.

The center-tap lead P5 is connected to one side of a thermal overload interrupter 26, the latter being connected via a suitable lead (not shown) to the input side of an automatic polarity selector means 28. Also connected to the input side of the polarity selector means 28 is the heat sink HS via an integral radial connector pin 30 and a lead 32.

The output side of the polarity selector 28 is connected, via a pair of output leads P6 and P7, with a pair of output connector pins 34 and 36, respectively, in the output connection socket 14.

The heat sink HS is comprised of material such as heavy gauge aluminum which has both high electrical and high thermal conductivities. Thus, the rectifiers R1 and R2 are electrically connected with the heat sink HS, the latter providing a common cathode terminal therefor as well as a means for preventing heat damage to the said rectifiers.

The entire assembly is potted within the shell 12 in a potting mixture 38 of epoxy resin and asbestos fibers, the said mixture 38 filling all voids including the central portion of the heat sink HS.

Figure 3:
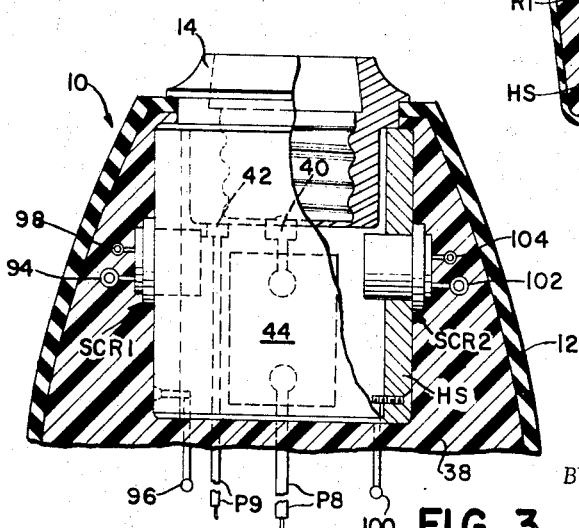
FIGURE 3 is a partial cross-section of another embodiment of the present invention.

Referring now to FIGURE 3, the heat sink HS is shown as a common connection for first and second silicon controlled rectifiers SCR1 and SCR2, respectively, hereinafter to be referred to merely as the SCR1 and the SCR2.

The internally threaded version of the output socket 14 is adapted for a two wire D.C. output via a central contact 40 and a peripheral contact 42 connected, respectively, with power output leads P8 and P9. The output lead P8 includes an in-line thermal overload bimetal switch means 44.

Figure 4:
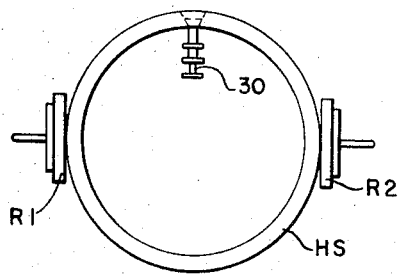
FIGURE 4 is a bottom end view of the heat sink structure shown in FIGURE 2.
Figure 5:
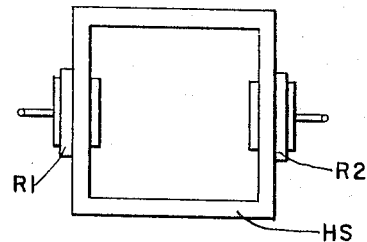
FIGURE 5 is a bottom end view of another embodiment of FIGURE 4.

Referring now to FIGURES 4 and 5, FIGURE 4 shows that the heat sink HS may take the form of a hollow cylinder and FIGURE 5 shows that the said heat sink HS may be a hollow rectangular shape. Thus, any suitable hollow shape may be utilized for the said heat sink HS.

AUTOMATIC POLARITY SELECTION

The first self-polarizing embodiment of the power pack 10 will now be described with reference to FIGURE 6.

The transformer 20 is shown as including a primary winding 46 supplied by conventional 120 volt, 60 cycle alternating current power from a power plug 48 connected with a suitable power source (not shown). A secondary winding 50 on the transformer 20 is provided with a center tap 52 which, as defined with reference to FIGURE 2 is connected via a center tap lead P5 with a thermal overload protector means 26, the latter being connected, via a lead 54, with a first input terminal 56 of an automatic polarity selector means 28.

The polarity selector means 28 includes a second input terminal 58 which is connected with the common cathode connection 60 of the first and second rectifier means R1 and R2, via a lead 62, which rectifier means have their respective anodes connected to opposite ends of the secondary windings 50 via the power leads P3 and P4, respectively. Thus, the common cathode connection 60 actually comprises the heat sink HS as defined in FIGURE 2.

The input terminals 56 and 58 are cross coupled, respectively, through first and second reversing leads 62 and 64 with a second pair of terminals 66 and 68 which, together with a rocking armature-double pole-double throw reversing switch means 70.

The rocking switch means 70 comprises a pair of V-shaped switch blades 72 ganged together via a common pin 74 or the like.

One of the switch arms 72 is contacted on either end thereof by suitable extension means 76 of an electromagnetic rocking armature 78 having a central pivot mounting 80 and further having an energizing and polarity sensing winding 82 thereon.

The polarity sensing winding is connected via series leads 84 and 86 with a pair of output terminals 88 and 90 via the power output leads P6 and P7 previously described with reference to FIGURE 2.

The automatic polarity selector 28 is completed by a permanent stator or field magnet 92 having one of its magnetic poles opposite a respective end of the rocking armature 78.

SOLID STATE AUTOMATIC POLARITY SELECTION

A second self-polarizing embodiment of the power pack 10 using the silicon controlled rectifiers SCR1 and SCR2 previously identified in FIGURE 3 will now be described with reference to FIGURES 3 and 7.

Figure 6:
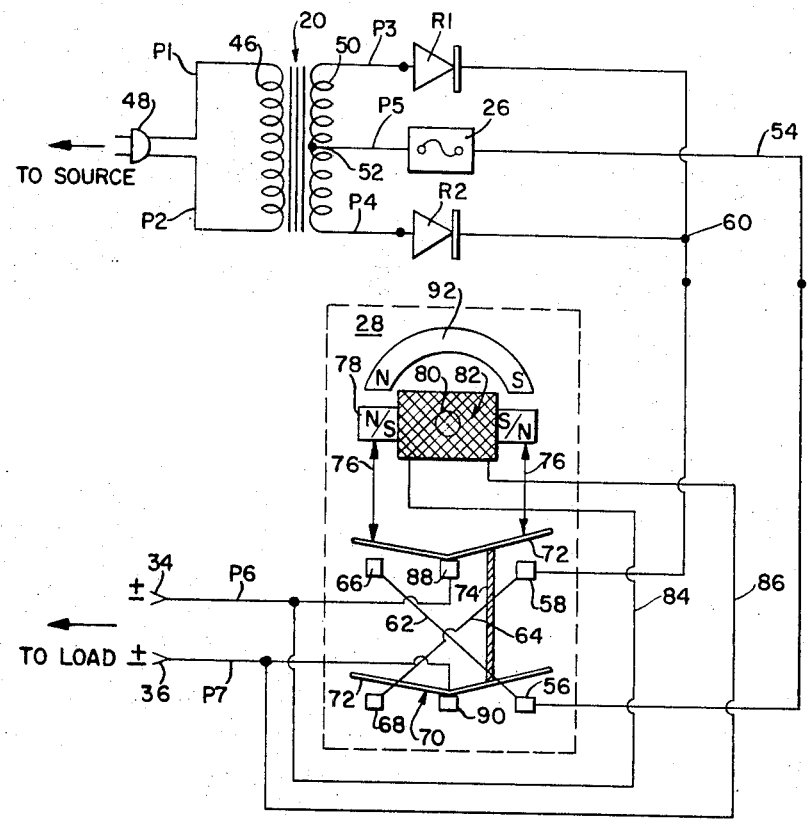
FIGURE 6 is a circuit diagram of a first embodiment of a self-polarizing battery charger of the present invention.

The power plug 48, input leads P1 and P2, the transformer 20, the primary winding 46 thereof, the secondary winding 50 and its center tap 52 are all shown in the hereinbefore-defined relationship of FIGURE 6.

In the control portion of the power pack the SCR1 includes anode, cathode and gate terminals 94, 96 and 98 respectively; the SCR2 includes anode, cathode and gate terminals 100, 102 and 104, respectively; the heat sink HS provides a common connection 106 for the SCR1 cathode terminal 96 and the SCR2 anode terminal 100; the power leads P3 and P4 connect the SCR2 cathode terminal 102 and the SCR1 anode terminal 94, respectively, with opposite ends of the secondary winding 50.

The output of the power pack is taken directly from the center tap 52 of the secondary 50 via the output lead P9 to the second output terminal 42 and from the common junction 106 through the output lead P8 and in-line thermal overload means 44 to the first output terminal 40. The said secondary power leads P3 and P4 are connected with the output lead P9 via first and second standard load resistors RX1 and RX2, respectively, the latter along with the leads P3 and P4 being connected with the respectively associated anode terminal 94 of the SCR1 and the cathode terminal 102 of the SCR2.

First and second control windings W1 and W2 are provided, respectively, in the gate circuits of the SCR1 and SCR2 and are disposed concentrically or otherwise inductively coupled with the secondary power leads P4 and P3, respectively. These control windings W1 and W2 are connected in series, having on one side of each common connection point 108. However, the first control winding W1 is connected at its other side with the cathode terminal 96 of the SCR1, while the second control winding W2 is connected at its other side with the cathode terminal 102 of the SCR2.

An automatic polarity sensing means 110 is provided in the power pack and includes an electromagnet 112 including a pair of pole pieces 114 having windings 116 thereon which are connected in series between a pair of connection points 118 and 120 in the output leads P8 and P9, respectively.

In the air gap between the pole pieces 114 of the electromagnet 112 is a vane mounted permanent magnet 112 or other suitable ferromagnetic means which comprises an extension of a double-throw polarity selecting switch arm 124, the said arm 124 being pivoted about a central terminal connection 126 of a polarity selecting double-throw single-pole switch 128.

First and second reed or spring contacts 130 and 132, respectively, on either side of the switch arm 124 are respectively connected with the SCR1 gate terminal 98 and the SCR2 gate terminal 104. The central terminal connection 126 and the switch arm 124 are connected directly to the common connection 108 between the first and second control windings W1 and W2 to complete the power selecting network as well as the power pack circuit.

The load 134 is shown as a battery which may be connected with either pole thereof at either one or the other of the output terminals 40 and 42 as will hereinafter be more fully described.

SOLID STATE NON-POLARIZED POWER PACK

A power pack embodiment of the present invention which does not have automatic polarity compensation but which automatically maintains the proper charge on a battery load or other variable demand load device within predetermined parametric limits of output current will now be described with reference to FIGURE 8.

The transformer 20 is shown with the power plug 48 and primary leads P1 and P2 feeding its primary winding 46 as in FIGURES 6 and 7. However, in this embodiment the secondary winding 50 has no center tap.

A single silicon controlled rectifier SCR3, hereinafter referred to merely as SCR3, having anode, cathode and gate terminals 136, 138 and 140, respectively, is connected by the cathode terminal 138 thereof to one side of the secondary winding 50. The anode terminal 136 of the SCR3 is connected through an in-line ammeter 142 with a first output terminal 144 via a first output lead P10, a second power output lead P11 is connected from the other side of the secondary winding 50, through an in-line thermal overload means 146 to a second output terminal 148.

A control winding W3 is concentrically disposed with respect to the second output lead P11 and is connected in series with a resistance means 150 between the gate terminal 140 and cathode terminal 138 of the SCR3. A standard load resistor RX3 is connected between the cathode terminal 138 of the SCR3 and a terminal 151 on the output lead P11, the terminal 151 being intermediate the control winding W3 and the thermal overload means 146. The circuit is completed by a battery load 152 or the like connected between the first and second output terminals 144 and 148.

OUTPUT VERSATILITY OF THE POWER PACK

Referring jointly to FIGURES 2, 3, 9, 10, 11 and 12, several examples of the versatility of outputs connections and resultant end uses of the power pack of the present invention can be readily seen in conjunction with the following description.

Figure 9:
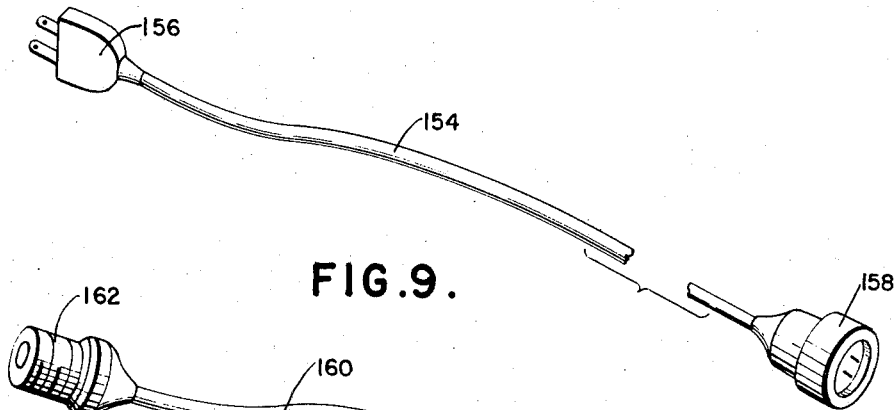
FIGURE 9 is a detachable power cord for the power pack of FIGURES 1 and 2.

In FIGURE 9, a power input cable 154 comprising a power plug 156 and a mating female socket 158 for the input socket 14 of FIGURE 2, the latter also being incorporated but not shown for the embodiment of FIGURE 3, is provided for the purpose of energizing the power pack 10 from a suitable alternating current power source.

Figure 10:
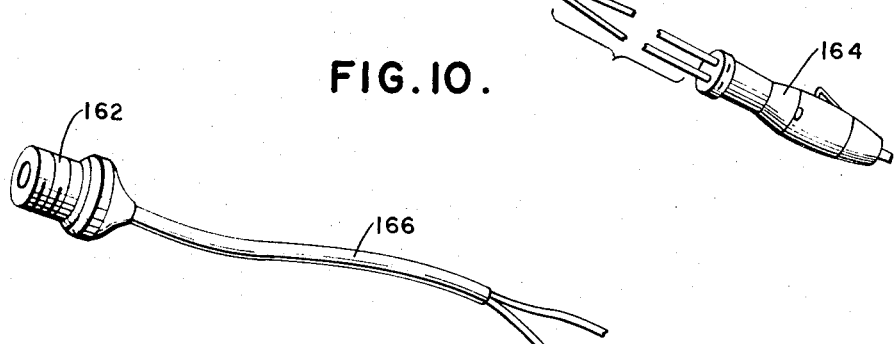
FIGURE 10 is an output cord for charging a battery of an automobile through the cigarette lighter socket therein, from the power pack of FIGURES 1 and 2.

In FIGURE 10, a battery charger cable 160 is provided having, at one end thereof, a screw-in male socket adapter 162 for the threaded output socket 16 of FIGURE 3 and at the other end thereof a plug-in adapter 164 for the conventional cigarette lighter socket (not shown) of any boat, automobile or the like which is so equipped. This particular and novel battery charging connection is made possible by means of the automatic polarity sensing means of the present invention as will be hereinafter more fully described.

Figure 11:
FIGURE 11 is a clip type battery charging output cord for the power pack of FIGURES 1 and 2.

A more conventional battery charging cable 166 is shown in FIGURE 11 having the same threaded male adapter 162 at one end thereof but having a pair of alligator clips 168 or the like at the other end thereof for direct connection with the terminal posts of a battery or other load device.

A trouble light output cable 170 comprising the threaded adapter 162 at one end thereof and a trouble light 172 at the other may also be utilized with the power pack 10, the latter supplying preselected voltages and currents suitable for such operation.

OPERATION

I. *Solid state non-polarized power pack*

Referring first to FIGURE 8, the operation of the non-polarized solid state embodiment of the subject invention will first be described.

It is first assumed that an alternating current power input is present at the power plug 48, causing the transformer 20 to be energized and thus, inducing an alternating current in the loop comprising the secondary winding 50, cathode terminal 138, load resistor RX3, terminal 151 and output lead P11, thus inducing an alternating magnetic flux field around the said lead P11 in the vicinity of the control winding W3.

Assuming a battery load 152 across the output terminals 144 and 148 with the terminal 148 connected to the positive terminal of the battery, the transformer 20 is designed such that the voltage difference across the anode-cathode path 136–138 of the SCR3, if the battery load 152 is fully charged, will not provide sufficient forward bias to maintain sufficient current in the SRC3 to keep it conductive, even in the presence of the proper gate voltage at the gate terminal 140 thereof.

If, however, the terminal voltage of the battery is low, in directing a condition of discharge, the inductive coupling between the alternating magnetic flux around the output lead P11 and the control winding W3 causes a voltage to be induced in the control winding W3. This induced voltage results in a flow of current from one side of the control winding W3 through the limiting resistor 150, into the gate terminal 140 of the SCR3 and through the cathode terminal 138 thereof back to the other side of the said control winding which results in gating the SCR3 into the "ON" state. Thus, alternate half cycles of the A.C. input of the same polarity are passed to the battery load 152 to charge same.

As the degree of charge on the battery load 152 increases, the current drawn thereby undergoes an exponential decrease until it drops below the value of sustaining current necessary to maintain the SCR3 on the "ON" (conductive) state, at which time the charging cycle is terminated by the automatic cut off of the SCR3.

Thus, the SCR3 is fully automated to cut on in response to induced gate voltage in the control winding W3 in the presence of minimum forward bias across the anode-cathode path 136–138 thereof and to cut off in response to the satisfied demand of the battery load 152, the latter also being a function of the said forward bias.

Figure 12:
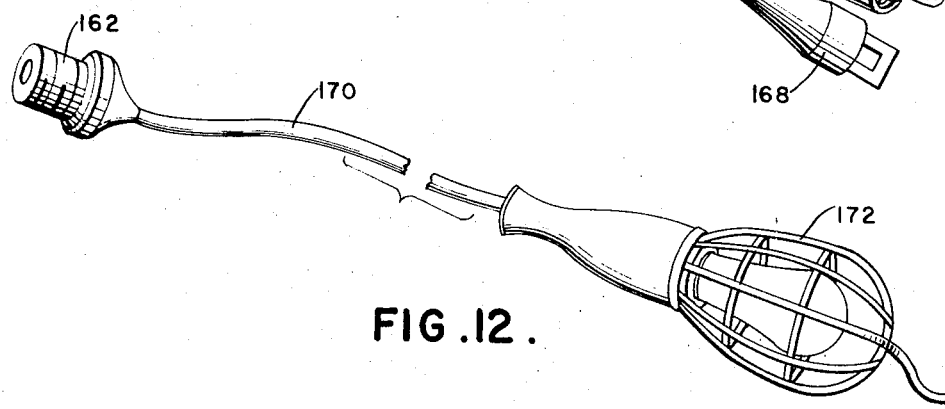
FIGURE 12 is a trouble light and integral output chord for the power pack of FIGURES 1 and 2.

In the case of a resistive load such as the trouble light 172 of FIGURE 12, the SCR3 will always have sufficient forward bias in the anode-cathode path 136–138 and will therefore, remain conductive for so long as the power plug 48 is energized or the load is connected thereto.

II. *Solid state polarized power pack*

Referring now to FIGURES 3 and 7, the solid state embodiment of the self-polarized power pack of the present invention will now be described.

Assume the same energization of the power plug 48 and transformer 20 as in the description of operation of FIGURE 8 and assume a battery load 134 connected across the output leads P8 and P9 at the output terminals 40 and 42, respectively.

Assume first that the positive and negative terminals of the battery load 134 are connected to the output terminals 40 and 42, respectively. Thus, the common junction 106 is now of positive polarity and the center tap 52 of the secondary winding 50 is of negative polarity.

Initially in the operation, both the first and second control windings W1 and W2 have induced voltages being generated therein due to their magnetic coupling with the alternating flux surrounding the leads P4 and P3, respectively, said flux being induced by current flow in the secondary circuits via the load resistors RX1 and RX2. However, since the main contact arm 124 of the polarity control switch 128 is not made with either of the spring contacts 130 or 132, neither the gate circuit of the SCR1 nor the SCR2 is complete.

Immediately upon the assumed polarity connection of the battery load 134, however, the polarity selector 110 is energized by a current flowing from the output terminal 40, through the output lead P8, thermal overload means 44, common junction 106, junction 118, polarity sensing windings 116, terminal 120 and output lead P9 back to the other output terminal 42 at the other side of the load 134.

This causes the magnet 122 to be drawn toward the lower of the pole pieces 114 and results in the main switch arm or contact 124 making with the spring contact 130.

As a result, the gate circuit of the SCR1 is completed via the path through the main terminal 126 of the selector switch 128, common junction 108, first control winding W1 and the cathode terminal 96 of the SCR1 as one side of the circuit and the main contact 124, spring contact 130 and gate terminal 98 of the SCR1 as the other. This causes the SCR1 to gate "ON" and charge the battery load 134 to the point at which the SCR1 shuts off exactly in the manner defined for the embodiment of FIGURE 8, i.e. as a function of the change in forward bias across the anode-cathode path 94–96 of the SCR1.

Assuming second, that the battery load is reversed in polarity, the center tap 52 of the secondary 50 will become positive and the common junction 106 will become negative.

This results in a reversal of current through the polarity sensing windings 116 and causes the main contact 124 of the polarity control switch 126 to make with the spring contact 132. Thus the gate circuit of the SCR2 is completed via the said contacts 124 and 132, the gate terminal 104, cathode terminal 102, control winding W2, common junction 108 and main terminal 126 of the polarity switch 128 causing the SCR2 to cut on and charge the battery load 134. The cutoff of the SCR2 is controlled by its forward bias as was that of the SCR1.

Therefore, it can be seen that no arcing can occur at the output terminals 40 and 42 during connection of the load 134, because no charging circuit has been completed until after the said load 134 has been connected and caused a subsequent response of the polarity control means 110. The power pack is thus explosion proof. Further, unless the load 134 is a polarized load there will be no energization of the power pack.

III. Self-polarized power pack

Referring now to FIGURES 2 and 6, the self-polarizing embodiment of the power pack of the present invention shown therein will now be described.

Again assuming A.C. energization at the power plug 48, the transformer 20 will effect energization of the rectifier diodes R1 and R2, placing an open circuit D.C. voltage of one polarity sense across the input terminals 56 and 68 of the polarity control means 28 and of a reverse polarity sense across the input terminals 66 and 68 thereof.

Assuming that a battery load has been connected across the output terminals 34 and 36 such that the terminal 34 is positive and the terminal 36 is negative, there will be a resulting current from the terminal 34 through output lead P6, lead 84, polarity sensor winding 82, lead 86 and output lead P7 back to the output terminal 36.

Assuming now that the lead 54 from the center tap 52 of the secondary winding 50 is negative, the armature 78 will rotate or rock clockwise about the pivot 80 causing the ganged switch contacts 70 and 72, respectively, to make with the input contacts 56 and 58 of the polarity control means 28. Thus, the power leads 54 and 62 from the center tap 52 and the rectifiers R1 and R2, respectively, are connected in the proper polarity through the terminals 90 and 88 and power output leads P7 and P8 with the output terminals 34 and 36 and the assumed load thereon.

If now, the polarity of the load is reversed, the armature 78 will rock counterclockwise about the pivot 80 due to the reverse energization of the sensing winding 82 and the power leads 54 and 60 will be connected to the output leads P6 and P7 via the terminals 66 and 68, switch blades 70 and 72 and terminals 90 and 92 to compensate for the assumed reverse polarity connection of the load.

In this embodiment as in the solid state self-polarized power pack, no arcing is effected on connecting the load and only a polarized load will be supplied with energy from the power pack.

IV. Heat dissipation

It is to be expressly understood that the embodiment of FIGURES 2 and 6 may be used with purely resistive loads by omitting the polarity selector 28 and connecting the leads 54 and 60 with the power output leads 36 and 34, respectively.

The transformer 20 and either the rectifiers R1 and R2 of FIGURES 2, 4, 5 and 6, or the silicon controlled rectifiers SCR1 and SCR2 of FIGURES 3 and 7 or the SCR3 of FIGURE 8 generate a substantial amount of heat during operation of the power pack 10 which, in the absence of the present invention as to the heat sink HS, expoxy resin potting 38 and shell 12, would result in such elevated temperatures as to preclude human handling of the power pack 10 after even a short period of operation except with the use of insulated handling means.

Referring, for example, to FIGURES 1 and 2, as the temperature of the rectifiers R1 and R2 rises, the heat therefrom is rapidly absorbed throughout the highly thermally conductive material of the heat sink HS, preventing any damage to the said rectifiers from localized heating effects.

Within the walls of the heat sink HS, the epoxy material 38 tends to reach a stabilized operating temperature which is monitored by the thermal overload switch 26 to prevent thermal damage to the power pack 10.

The tendency of thermal systems to achieve equilibrium is uniquely controlled by the laminated structure of the power pack 10, the rate of heat flow from the heat sink HS and transformer 20 substantially radially outward through the epoxy-asbestos filler 38 and thence through the shell 12 being found to achieve a substantially constant external temperature for the power pack 10 regardless of the extent of the energization thereof. Thus, human handling with bare hands is readily, comfortably, and safely achieved.

The resulting power pack is completely shock proof, oil proof, water proof and foolproof and satisfies a long felt need in the art for such a versatile and compact device.

The stability of operating temperature holds true for all of the embodiments disclosed herein, and all other such embodiments contemplating the mounting of the rectifier or solid state switching means in a heat sink such as that taught by the present invention.

It is to be understood that the several embodiments of the invention shown and described herein are for the purpose of example only and are not intended to limit the scope of the appended claims.

What is claimed is:

1. In a power pack including an alternating current supply, a load, a transformer having an input and an output connected at its input to said supply, and controlled semiconductor rectifier means, having anode, cathode and gate terminals, connected with the output of said transformer and with said load; the combination of an auxiliary load circuit connected across the output of said transformer and control means selectively applying a gating signal to said rectifier means comprising inductive winding means, inductively coupled with said auxiliary load circuit, connected in series between said cathode and gate terminals of said rectifier means.

2. A self-regulating power pack comprising an alternating current supply; a variable demand load; a transformer having an input and an output, connected at its input to said supply; controlled semiconductor rectifier means, having anode, cathode and gate terminals, connected with its anode-cathode path in series with the output of said transformer and said load; an auxiliary load circuit connected across the output of said transformer in shunt with said rectifier and said load; and control means selectively applying gating signals to said rectifier means comprising inductive winding means, inductively coupled with said auxiliary load circuit, connected in series between said cathode and gate terminals of said rectifier means.

3. In a power pack including an alternating current supply, a polarized load, a transformer having an input and an output, connected at its input to said supply, and first and second controlled semiconductor rectifier means each having anode, cathode and gate terminals, connected, respectively, in opposed polarities with said transformer output and said polarized load; the combination of control means selectively applying gating signals to said first and second rectifier means comprising, respectively, first and second inductive winding means inductively coupled with the output of said transformer, adapted to be connected in series between the said cathode and gate terminals of the respective ones of said rectifier means, and means automatically responsive to the polarity of said polarized load selectively connecting one of said inductive winding means in series with the respectively associated gate and cathode terminals of one of said controlled rectifier means as a function of the polarity of said polarized load, whereby only that one of said rectifier means of compatible polarity with said polarized load is energized.

4. The invention defined in claim 3, wherein said means automatically responsive to the polarity of said polarized load comprises electromagnetic means connected across said polarized load and energized thereby as a function of the polarity thereof, and switch means magnetically responsive to said electromagnetic means selectively connecting said first and second inductive winding means in series, respectively, with said cathode and gate terminals of said first and second controlled rectifier means.

5. In a power pack including an alternating current supply, a polarized load, a transformer having an input and an output, connected at its input to said supply, and first and second controlled semiconductor rectifier means each having anode, cathode and gate terminals, connected, respectively, in opposed polarities with said transformer output and said polarized load; the combination of an auxiliary load circuit connected across the output of said transformer, control means selectively applying gating signals to said rectifier means comprising first and second inductive winding means inductively coupled with said auxiliary load circuit, adapted to be connected in series between the said cathode and gate terminals of the respective ones of said rectifier means, and means automatically responsive to the polarity of said polarized load selectively connecting one of said inductive winding means in series with the respectively associated gate and cathode terminals of one of said controlled rectifier means as a function of the polarity of said polarized load, whereby only that one of said rectifier means of compatible polarity with said polarized load is energized.

6. The invention defined in claim 5, wherein said means automatically responsive to the polarity of said polarized load comprises electromagnetic means connected across said polarized load and energized thereby as a function of the polarity thereof, and switch means magnetically responsive to said electromagnetic means selectively connecting said first and second inductive winding means in series, respectively, with said cathode and gate terminals of said first and second controlled rectifier means.

7. In a power pack adapted to supply a load including an alternating current supply, a transformer having an input and an output, connected at its input to said supply, and controlled semiconductor rectifier means, having anode, cathode and gate terminals, connected with the output of said transformer and adapted to be connected with a load; the combination of control means adapted to selectively apply gating signals to said rectifier means comprising inductive winding means inductively coupled with the output of said transformer and means responsive to the presence of a load connected with said rectifier means automatically connecting said winding means in series with the said cathode and gate terminals of said rectifier means.

8. In a power pack adapted to supply a load including an alternating current supply, a transformer having an input and an output, connected at its input to said supply, and controlled semiconductor rectifier means, having anode, cathode and gate terminals, connected with the output of said transformer, and adapted to be connected with a load; the combination of an auxiliary load circuit connected across the output of said transformer, control means adapted to selectively apply gating signals to said rectifier means comprising inductive winding means inductively coupled with said auxiliary load circuit, and means responsive to the presence of a load connected with said rectifier means automatically connecting said winding means in series with the said cathode and gate terminals of said rectifier means.

9. A self-regulating self-polarized power pack adapted to supply power to a variable demand polarized load comprising an alternating current supply; a transformer having an input and an output, connected at its input to said supply; output terminals adapted to be connected with a polarized load; first and second controlled semiconductor rectifier means, each having anode, cathode and gate terminals, connected, respectively, in opposed polarities with said transformer output and said output terminals; control means adapted to selectively apply gating signals to said first and second rectifier means comprising, respectively, first and second inductive winding means inductively coupled with the output of said transformer; and means automatically responsive to the polarity and presence of a polarized load at said output terminals selectively connecting one of said inductive winding means in series with the respectively associated gate and cathode terminals of one of said controlled rectifier means as a function of the polarity and presence of a polarized load at said output terminals.

10. The invention defined in claim 9, wherein said means automatically responsive to the polarity and presence of a polarized load comprises electromagnetic means connected across said output terminals and adapted to be energized by a polarized load connected to said output terminals, and switch means magnetically responsive to said electromagnetic means selectively connecting said first and second inductive winding means in series respectively, with said cathode and gate terminals of said first and second controlled rectifier means.

11. A self-regulating self-polarized power pack adapted to supply power to a variable demand polarized load comprising an alternating current supply; a transformer having an input and an output connected at its input to said supply; output terminals adapted to be connected with a polarized load; first and second controlled semiconductor rectifier means, each having anode, cathode and gate terminals, connected, respectively, in opposed polarities with said transformer output and said output terminals; an auxiliary load circuit connected across the output of said transformer; control means adapted to selectively apply gating signals to said rectifier means comprising first and second inductive winding means inductively coupled with said auxiliary load circuit; and means automatically responsive to the polarity and presence of a polarized load at said output terminals selectively connecting one of said inductive winding means in series with the respectively associated gate and cathode terminals of one of said controlled rectifier means as a function of the polarity and presence of a polarized load at said output terminals.

12. The invention defined in claim 11, wherein said means automatically responsive to the polarity and presence of a polarized load comprises electromagnetic means connected across said output terminals and adapted to be energized by a polarized load connected to said output terminals, and switch means magnetically responsive to said electromagnetic means selectively connecting said first and second inductive winding means in series, respectively, with said cathode and gate terminals of said first and second controlled rectifier means.

References Cited
UNITED STATES PATENTS

| | | | |
|---|---|---|---|
| 2,509,239 | 5/1950 | Mattheyes | 320—26 |
| 2,894,148 | 7/1959 | Trottier | 307—127 |
| 3,085,187 | 4/1963 | Godshalk | 320—25 |
| 3,118,101 | 1/1964 | Arber | 320—26 |
| 3,219,910 | 11/1965 | Klimo | 321—47 |
| 3,221,183 | 11/1965 | White | 307—88.5 |

JOHN F. COUCH, *Primary Examiner.*

S. WEINBERG, *Assistant Examiner.*